(12) United States Patent
Yamakawa

(10) Patent No.: US 9,593,047 B2
(45) Date of Patent: Mar. 14, 2017

(54) ONE-COMPONENT WATER-REDUCING AGENT, AND PREPARATION OF HYDRAULIC COMPOSITION

(71) Applicant: SHIN-ETSU CHEMICAL CO., LTD., Tokyo (JP)

(72) Inventor: Tsutomu Yamakawa, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/795,014

(22) Filed: Jul. 9, 2015

(65) Prior Publication Data

US 2016/0009599 A1 Jan. 14, 2016

(30) Foreign Application Priority Data

Jul. 10, 2014 (JP) ................................ 2014-142198
Sep. 9, 2014 (JP) ................................ 2014-183182

(51) Int. Cl.
| C04B 24/38 | (2006.01) |
| C04B 24/28 | (2006.01) |
| C04B 28/02 | (2006.01) |
| C04B 40/00 | (2006.01) |
| C04B 103/44 | (2006.01) |

(52) U.S. Cl.
CPC .......... *C04B 24/386* (2013.01); *C04B 24/283* (2013.01); *C04B 28/02* (2013.01); *C04B 40/0042* (2013.01); *C04B 2103/44* (2013.01)

(58) Field of Classification Search
CPC ......... C04B 24/38; C04B 24/28; C04B 24/02; C04B 24/36; C04B 24/386; C04B 24/283; C04B 40/0042; C04B 2103/44; C04B 28/02

USPC .............................................................. 524/5
See application file for complete search history.

(56) References Cited

U.S. PATENT DOCUMENTS

| 7,909,927 | B2 * | 3/2011 | Margheritis | ............ C04B 28/02 |
| | | | | 106/205.1 |
| 2006/0124034 | A1 * | 6/2006 | Okazawa | ............ C04B 40/0039 |
| | | | | 106/823 |

FOREIGN PATENT DOCUMENTS

| CN | 102173678 A | * | 9/2011 | ............ C04B 28/02 |
| CN | 102173678 A | | 9/2011 | |
| CN | 103113038 A | * | 5/2013 | |
| CN | 103113038 A | | 5/2013 | |
| GB | 1265821 A | * | 3/1972 | ............... C08L 1/26 |
| GB | 1265821 A | | 3/1972 | |
| JP | 2008-137889 A | | 6/2008 | |
| JP | 2011-509908 A | | 3/2011 | |
| JP | 2014-125389 A | | 7/2014 | |
| JP | 2014125389 A | * | 7/2014 | |
| WO | WO 03/024884 A1 | | 3/2003 | |
| WO | WO 2009/090203 A2 | | 7/2009 | |

OTHER PUBLICATIONS

Extended European Search Report, dated Nov. 16, 2015, for European Application No. 15174048.7

* cited by examiner

*Primary Examiner* — Michael M Bernshteyn
(74) *Attorney, Agent, or Firm* — Birch, Stewart, Kolasch & Birch, LLP

(57) ABSTRACT

The invention provides a thickener for hydraulic composition comprising (A) a water-soluble cellulose ether, (B) a defoamer, and (C) a gum. The thickener is combined with a hydraulic substance, an aggregate and water to form a hydraulic composition.

2 Claims, No Drawings

ONE-COMPONENT WATER-REDUCING AGENT, AND PREPARATION OF HYDRAULIC COMPOSITION

CROSS-REFERENCE TO RELATED APPLICATION

This non-provisional application claims priority under 35 U.S.C. §119(a) on Patent Application Nos. 2014-142198 and 2014-183182 filed in Japan on Jul. 10, 2014 and Sep. 9, 2014, respectively, the entire contents of which are hereby incorporated by reference.

TECHNICAL FIELD

This invention relates to a thickener for hydraulic composition, a one-component water-reducing agent, and a method for preparing a hydraulic composition.

BACKGROUND ART

A hydraulic composition is generally composed of a hydraulic substance such as cement, an aggregate such as fine or coarse aggregate, and water. Since it is a collection of inorganic materials having different specific gravity, particle shape and particle size, it is essentially liable to material separation or segregation. The hydraulic composition having undergone segregation suffers from the serious problem that the composition as hardened varies in quality, or varies or lowers in strength. The segregation may be inhibited by increasing the viscosity of the hydraulic composition to prevent inorganic materials from settling down.

For increasing the viscosity of the hydraulic composition, it would be effective to add water-soluble polymer as the viscosity increasing agent or thickener. Usually cement is strongly alkaline as demonstrated by a pH value of 12 or higher because many $Ca^{2+}$ ions are available from calcium oxide which is one component of cement. Since the water-soluble polymer is thus exposed to rigorous conditions including decomposition by alkali and agglomeration by metal ions, most water-soluble polymers fail to increase the viscosity of the system. Cellulose ethers, nonionic water-soluble polymers are a few water-soluble polymers that can increase the viscosity of the system.

Water-soluble cellulose ethers such as hydroxypropyl methyl cellulose, which are water-soluble polymers, are effective for increasing viscosity even in concrete. They are widely used in concrete applications including antiwashout underwater concrete (for inhibiting separation during underwater application), spraying concrete (for preventing dust generation during spraying), and self-consolidating concrete (for inhibiting material separation).

Also, diutan gum and welan gum which are water-soluble polymers are used in hydraulic compositions such as mortar and concrete. For example, JP-A 2011-509908 discloses the use of diutan gum in highly self-consolidating concrete.

However, since water-soluble cellulose ether is generally used in powder form, it is awkward to handle as compared with other admixtures which are liquid. The cellulose ether tends to form clumps when added. When a minor amount of cellulose ether is added, scattering makes it difficult to add a desired amount.

To solve the problem, a one-component water-reducing agent obtained by previously combining water-soluble cellulose ether with a water-reducing agent is proposed. For example, JP-A 2008-137889 discloses a combination of a defoamer with water-soluble cellulose ether and a water-reducing agent.

CITATION LIST

Patent Document 1: JP-A 2011-509908 (WO 2009/090203)
Patent Document 2: JP-A 2008-137889 (WO 03/024884)

DISCLOSURE OF INVENTION

The method of Patent Document 1 is not directed to a one-component water-reducing agent of water-soluble cellulose ether and a water-reducing agent. When minor amounts of water-soluble cellulose ether and diutan gum are added, it is difficult to meter the desired amounts because of scattering. The resulting hydraulic composition fails to exert the full effect.

The method of Patent Document 2 is directed to a one-component water-reducing agent. It can be added without the risk of scattering of water-soluble cellulose ether. When the water-reducing agent is mixed with water-soluble cellulose ether, material separation or segregation occurs due to salting out. When the one-component water-reducing agent having undergone segregation is mixed with a hydraulic substance, it is unlikely that the resulting hydraulic composition has satisfactory physical properties, because the water-reducing agent and water-soluble cellulose ether are not present in the desired concentration.

An object of the invention is to provide a thickener for hydraulic composition comprising a water-soluble cellulose ether, a defoamer, and a gum; one-component water-reducing agent comprising the thickener in combination with a water-reducing agent, which admixture is unsusceptible to segregation and has stable dispersion relative to a hydraulic substance such as cement; and a method for preparing a hydraulic composition having improved bleeding properties wherein a desired minor amount of water-soluble cellulose ether can be added without the risk of scattering.

The inventor has found that by first preparing a thickener for hydraulic composition comprising a water-soluble cellulose ether, a defoamer, and a gum, combining the thickener with a water-reducing agent to form a one-component water-reducing agent having stable dispersibility, and mixing the admixture with a hydraulic substance, a hydraulic composition having desired properties is obtained while the risk of scattering associated with the addition of minor amounts is suppressed.

In one aspect, the invention provides a thickener for hydraulic compositions, comprising (A) a water-soluble cellulose ether, (B) a defoamer, and (C) a gum. The gum is preferably selected from among diutan gum, welan gum, xanthan gum, and gellan gum. The water-soluble cellulose ether is preferably selected from among alkyl celluloses, hydroxyalkyl celluloses, and hydroxyalkyl alkyl celluloses.

In another aspect, the invention provides a one-component water-reducing agent comprising the thickener defined above and (D) a water-reducing agent. The water-reducing agent is preferably a polycarboxylic acid copolymer and/or a salt thereof.

In a further aspect, the invention provides a method for preparing a hydraulic composition, comprising the step of mixing the one-component water-reducing agent defined above with a hydraulic substance, an aggregate and water.

ADVANTAGEOUS EFFECTS OF INVENTION

Using a one-component water-reducing agent having stable dispersibility, a hydraulic composition having controlled bleeding is obtainable in which a desired minor amount of water-soluble cellulose ether is added while the risk of scattering associated with the addition of minor amount is suppressed.

DESCRIPTION OF PREFERRED EMBODIMENTS

One embodiment of the invention is a thickener for hydraulic composition, i.e., viscosity increasing agent for hydraulic compositions, comprising (A) a water-soluble cellulose ether, (B) a defoamer, and (C) a gum. Another embodiment is a one-component water-reducing agent comprising the thickener for hydraulic composition, specifically components (A) to (C), and (D) a water-reducing agent.

Component (A) is a water-soluble cellulose ether. It is desired that the water-soluble cellulose ether be nonionic and effective for preventing the hydraulic composition from segregation and bleeding for thereby improving the durability and minimizing the variation of strength and quality of the hydraulic composition. From these standpoints, the water-soluble cellulose ether is typically selected from among alkyl celluloses such as methyl cellulose and ethyl cellulose, hydroxyalkyl celluloses such as hydroxypropyl cellulose and hydroxyethyl cellulose, and hydroxyalkyl alkyl celluloses such as hydroxyethyl methyl cellulose, hydroxypropyl methyl cellulose, and hydroxyethyl ethyl cellulose.

Exemplary of the alkyl cellulose are methyl cellulose preferably having a DS of 1.0 to 2.2, more preferably 1.2 to 2.0 and ethyl cellulose preferably having a DS of 1.0 to 2.2, more preferably 1.2 to 2.0. Exemplary of the hydroxyalkyl celluloses are hydroxyethyl cellulose preferably having a MS of 0.1 to 3.0, more preferably 0.5 to 2.8 and hydroxypropyl cellulose preferably having a MS of 0.05 to 3.3, more preferably 0.1 to 3.0. Exemplary of the hydroxyalkyl alkyl cellulose are hydroxyethyl methyl cellulose preferably having a DS of 1.0 to 2.2, more preferably 1.2 to 2.0 and a MS of 0.05 to 0.6, more preferably 0.10 to 0.5, hydroxypropyl methyl cellulose preferably having a DS of 1.0 to 2.2, more preferably 1.2 to 2.0 and a MS of 0.05 to 0.6, more preferably 0.10 to 0.5, and hydroxyethyl ethyl cellulose preferably having a DS of 1.0 to 2.2, more preferably 1.2 to 2.0 and a MS of 0.05 to 0.6, more preferably 0.10 to 0.5.

As used in the art, DS refers to "degree of substitution" representing the number of alkoxy groups per glucose ring unit of cellulose, and MS refers to "molar substitution" representing an average molar amount of hydroxyalkoxy groups added per glucose ring unit of cellulose.

With respect to DS of alkyl and MS of hydroxyalkyl, measurement may be made by the analysis of DS of hypromellose (hydroxypropyl methyl cellulose) prescribed in the Japanese Pharmacopoeia, 16th Edition.

From the standpoint of providing the hydraulic composition with the desired viscosity, the water-soluble cellulose ether should preferably have a viscosity of 30 mPa·s (2 wt %) to 30,000 mPa·s (1 wt %), more preferably 80 mPa·s (2 wt %) to 25,000 mPa·s (1 wt %), and even more preferably 350 mPa·s (2 wt %) to 20,000 mPa·s (1 wt %) when measured at 20° C. as a 2 wt % or 1 wt % aqueous solution, using a Brookfield viscometer at 20 rpm. It is noted that the viscosity of water-soluble cellulose ether is measured as a 2 wt % aqueous solution when the viscosity is equal to or less than 50,000 mPa·s and a 1 wt % aqueous solution when the viscosity exceeds 50,000 mPa·s.

The water-soluble cellulose ether is preferably added in an amount of 0.01 to 20%, more preferably 0.05 to 10%, and even more preferably 0.1 to 5% by weight based on the water-reducing agent.

Component (B) is a defoamer. From the standpoint of stabilizing the water-soluble cellulose ether in the one-component water-reducing agent, the defoamer is preferably selected from among oxyalkylene, silicone, alcohol, mineral oil, fatty acid, and fatty acid ester base defoamers.

Examples of the oxyalkylene base defoamer include polyoxyalkylenes such as (poly)oxyethylene-(poly)oxypropylene adducts; (poly)oxyalkylene alkyl ethers such as diethylene glycol heptyl ether, polyoxyethylene oleyl ether, polyoxypropylene butyl ether, polyoxyethylene polyoxypropylene 2-ethylhexyl ether, and oxyethylene oxypropylene adducts to higher alcohols of 8 or more carbon atoms or secondary alcohols of 12 to 14 carbon atoms; (poly)oxyalkylene (alkyl) aryl ethers such as polyoxypropylene phenyl ether and polyoxyethylene nonyl phenyl ether; acetylene ethers obtained from addition polymerization of alkylene oxides to acetylene alcohols such as 2,4,7,9-tetramethyl-5-decyne-4,7-diol, 2,5-dimethyl-3-hexyne-2,5-diol, and 3-methyl-1-butyn-3-ol; (poly)oxyalkylene fatty acid esters such as diethylene glycol oleic acid ester, diethylene glycol lauric acid ester, and ethylene glycol distearic acid ester; (poly)oxyalkylene sorbitan fatty acid esters such as polyoxyethylene sorbitan monolauric acid ester and polyoxyethylene sorbitan trioleic acid ester; (poly)oxyalkylene alkyl (aryl) ether sulfuric acid ester salts such as polyoxypropylene methyl ether sodium sulfate and polyoxyethylene dodecyl phenol ether sodium sulfate; (poly)oxyalkylene alkyl phosphoric acid esters such as (poly)oxyethylene stearyl phosphoric acid ester; (poly)oxyalkylene alkyl amines such as polyoxyethylene lauryl amine; and polyoxyalkylene amides.

Examples of the silicone base defoamer include dimethylsilicone oil, silicone paste, silicone emulsions, organic modified polysiloxanes (e.g., polyorganosiloxanes such as dimethylpolysiloxane), and fluoro-silicone oil. Examples of the alcohol base defoamer include octyl alcohol, 2-ethylhexyl alcohol, hexadecyl alcohol, acetylene alcohol, and glycol. Examples of the mineral oil base defoamer include kerosine and liquid paraffin. Examples of the fatty acid base defoamer include oleic acid, stearic acid, and alkylene oxide adducts thereof. Examples of the fatty acid ester base defoamer include glycerol monolicinolate, alkenyl succinic acid derivatives, sorbitol monolaurate, sorbitol trioleate, and natural wax.

Of these, oxyalkylene, mineral oil and fatty acid ester base defoamers are preferred for the dispersion stability of the one-component water-reducing agent.

An appropriate amount of the defoamer added is 0.001 to 16%, more preferably 0.002 to 10% by weight based on the water-reducing agent. As long as the amount of the defoamer added is equal to or more than the necessary amount to control foaming of the water-soluble cellulose ether (typically, 5 to 10% by weight based on the water-soluble cellulose ether), the defoamer enhances stabilization against salting out. This is probably because any component (surfactant) in the defoamer adsorbs to the surface of the salting-out water-soluble cellulose ether to stabilize the cellulose ether.

Component (C) is a gum, which is effective for stabilizing the water-soluble cellulose ether in the one-component water-reducing agent. The gum is preferably selected from among diutan gum, welan gum, xanthan gum, gellan gum, and a mixture thereof.

It is presumed that in the one-component water-reducing agent, the water-soluble cellulose ether remains swollen rather than dissolved. If in a mixture of a water-soluble cellulose ether and an electrolyte, the electrolyte concentration exceeds a certain limit, there occurs a phenomenon (salting out) that the water-soluble cellulose ether becomes no longer dissolvable and precipitates out, that is, the cellulose ether settles down without being stabilized. For preventing the salting-out water-soluble cellulose ether from settling down, it is considered effective based on the Stokes' law to increase the viscosity of the one-component water-reducing agent as the dispersing medium. Performing experiments using a variety of water-soluble polymers, the inventor has discovered that a gum selected from among diutan gum, welan gum, xanthan gum, and gellan gum is effective to this end. Even when a water-soluble cellulose ether is salting out in a one-component water-reducing agent, the addition of a specific gum is successful in increasing the viscosity of the one-component water-reducing agent, and as a result, suppressing salting-out and preventing the water-soluble cellulose ether from settling down, that is, stabilizing the cellulose ether.

In general, in a ready-mixed concrete plant, a one-component water-reducing agent is fed from a tank to a concrete mixer where a predetermined amount thereof is added to concrete. Since the tank is not equipped with an agitator, the one-component water-reducing agent is statically held therein. During static storage of the one-component water-reducing agent, salting-out water-soluble cellulose ether will settle down. A portion of the one-component water-reducing agent pumped out of the tank does not contain a predetermined concentration of the cellulose ether, which means that the desired effect is not obtained when that portion of the one-component water-reducing agent is added to concrete. Surprisingly, a one-component water-reducing agent to which a gum is added maintains a uniform aqueous solution state because the water-soluble cellulose ether remains stable without salting out. Then a portion of the one-component water-reducing agent taken from anywhere in the tank contains a predetermined concentration of the cellulose ether.

Diutan gum is composed of a backbone of D-glucose, D-glucuronic acid, D-glucose and L-rhamnose and a side chain of two L-rhamnose, and commercially available, for example, as KELCO-CRETE DG-F (CP Kelco). Welan gum has a backbone of D-glucose, fl-glucuronic acid and L-rhamnose in 2:2:1 to which a side chain of L-rhamnose or L-mannose is attached, and is commercially available, for example, as CP KELCO K1A-96 (CP Kelco). Xanthan gum has a backbone of β-1,4-bonded D-glucose units like cellulose and a side chain composed of two mannose and one glucuronic acid, and is commercially available, for example, as KELZAN (CP Kelco). Gellan gum is a hetero-polysaccharide composed of repeat units of four sugars: D-glucose, D-glucuronic acid and L-rhamnose in 2:1:1, and commercially available, for example, as KELCOGEL AFT (CP Kelco).

The gum may be added either as powder or as aqueous solution. It is preferred from the standpoint of stabilizing the water-soluble cellulose ether to use welan gum, xanthan gum and gellan gum in aqueous solution form.

An appropriate amount of the gum added is, in the case of diutan gum, 0.005 to 2%, more preferably 0.01 to 1%, and even more preferably 0.1 to 0.8% by weight based on the water-reducing agent; in the case of welan gum, xanthan gum and gellan gum, 0.01 to 20%, more preferably 0.1 to 10%, and even more preferably 0.5 to 8% by weight based on the water-reducing agent.

Component (D) is a water-reducing agent. The water-reducing agent is preferably selected from among polycarboxylic acid, melamine and lignin derivatives since they are effective for reducing water by controlling agglomeration of the hydraulic composition in water. Inter alia, polycarboxylic acid derivatives are more preferred for water reducing effect, fluidity and fluidity maintenance. The preferred polycarboxylic acid derivatives are polycarboxylic acid copolymers and salts thereof. Exemplary of the polycarboxylic acid copolymers are copolymers of an unsaturated mono- or di-carboxylic acid such as acrylic acid, methacrylic acid, crotonic acid, maleic acid, fumaric acid, itaconic acid or citraconic acid with an unsaturated monomer selected from compounds of polyalkylene glycol mono(meth)acrylate, styrene and unsaturated alcohol having 1 to 100 moles of alkylene oxide added thereto. Exemplary of the melamine are melamine-sulfonic acid-formaldehyde condensates, melamine-sulfonic acid salt condensates, and melamine-sulfonic acid salt-polyol condensates. Exemplary of the lignin are lignin sulfonic acid salt and derivatives thereof.

Component (D), water-reducing agent is preferably added in an amount of 70.0 to 99.8%, more preferably 85.0 to 99.5%, and even more preferably 90 to 99.0% by weight based on the one-component water-reducing agent. Preferably the total weight of components (A), (B), (C) and (D) is 100% by weight. The water-reducing agent having a water reduction rate of 4 to 30% may be diluted to a suitable concentration prior to use.

A further embodiment of the invention is a method for preparing a hydraulic composition, comprising the step of mixing the one-component water-reducing agent (defined above as comprising the thickener for hydraulic composition) with at least a hydraulic substance, an aggregate and water. The water-soluble cellulose ether is premixed with the water-reducing agent to formulate a one-component water-reducing agent, which is added to the hydraulic substance. This procedure prevents the cellulose ether from scattering even when a minor amount of the cellulose ether is added. Since the desired amount of water-soluble cellulose ether is thus added, the resulting hydraulic composition has improved bleeding and other properties.

In the hydraulic composition, the one-component water-reducing agent is preferably added in an amount of 0.1 to 60 kg, more preferably 0.5 to 45 kg, and even more preferably 1.0 to 30 kg per cubic meters ($m^3$) of the hydraulic composition.

Typical of the hydraulic substance is cement. Suitable cements include ordinary Portland cement, early-strength Portland cement, moderate heat Portland cement, blast furnace slag cement, silica cement, fly-ash cement, alumina cement, and ultrahigh early-strength Portland cement. In the hydraulic composition, the hydraulic substance is preferably added in an amount of 100 to 600 kg, more preferably 200 to 500 kg, and even more preferably 220 to 400 kg per $m^3$ of the hydraulic composition.

Suitable aggregates include coarse aggregates and fine aggregates. Suitable coarse aggregates include river gravel, pit gravel, land gravel, and crushed stone and have a particle size of up to 40 mm, more preferably up to 25 mm. Suitable fine aggregates include river sand, pit sand, land sand, silica sand, and crushed sand and have a particle size of up to 10 mm, more preferably up to 5 mm.

In the hydraulic composition, the aggregate (total of coarse and fine aggregates) is preferably added in an amount of 1,200 to 2,000 kg, more preferably 1,500 to 1,900 kg per $m^3$ of the hydraulic composition. Also preferably the ratio of fine aggregate in total aggregates (known as sand percentage) is 30 to 55%, more preferably 35 to 50% by volume.

In the hydraulic composition, water is preferably added in an amount of 120 to 240 kg, more preferably 140 to 200 kg, and even more preferably 150 to 175 kg per $m^3$ of the hydraulic composition.

If necessary, an air entraining (AE) agent may be added to the hydraulic composition for gaining an amount of air and rendering the concrete durable. Suitable AE agents include anionic surfactants, cationic surfactants, nonionic surfactants and ampholytic surfactants. Suitable anionic surfactants are of carboxylic acid, sulfuric acid ester, sulfonic acid, and phosphoric acid ester types. Suitable cationic surfactants are of amine salt, primary amine salt, secondary amine salt, tertiary amine salt, and quaternary amine salt types. Suitable nonionic surfactants are of ester, ester-ether, ether, and alkanolamide types. Suitable ampholytic surfactants are amic acid and sulfo-betaine types. Inter alia, anionic surfactant based AE agents are preferred for air entrainment.

In the practice of the invention, a set accelerator (e.g., calcium chloride, lithium chloride or calcium formate) or a set retarder (e.g., sodium citrate or sodium gluconate) may be used in an ordinary amount for managing the fresh physical properties of the hydraulic composition immediately after mixing.

Further, a dry shrinkage reducing agent or expanding agent may be used in an ordinary amount for preventing cracking by shrinkage upon setting and drying, and cracking by thermal stresses associated with the heat of hydration of cement. Exemplary dry shrinkage reducing agents include alkylene oxide adducts, polyether and polyglycol. Exemplary expanding agents include $3CaO\cdot3Al_2O_3-CaSO_4$ and CaO.

Preferably, the AE agent is added in an amount of 0.001 to 0.01% by weight, the set accelerator or retarder is added in an amount of 0.01 to 10% by weight, the dry shrinkage reducing agent is added in an amount of 0.1 to 10% by weight, and the expanding agent is added in an amount of 0.1 to 10% by weight, all based on the weight of the hydraulic substance.

EXAMPLE

Examples of the invention are given below by way of illustration and not by way of limitation.
One-Component Water-Reducing Agent Examples 1 to 10 and Comparative Example 1

A one-component water-reducing agent was prepared by combining a water-reducing agent, water-soluble cellulose ether, defoamer, and gum, as shown below, in a mixing proportion as shown in Table 1, and mixing them on a homo-mixer (HM-310 by AS ONE Corp.) at 5,000 rpm for 1 minute. The one-component water-reducing agent was examined by the following test to determine a volume of sediment.

Ingredients
(1) Water-soluble cellulose ether
  hydroxypropyl methyl cellulose (HPMC)
    (DS=1.4, MS=0.2, 2 wt % aqueous solution viscosity=33,000 mPa·s at 20° C.)
  hydroxyethyl methyl cellulose (HEMC)
    (DS=1.5, MS=0.2, 2 wt % aqueous solution viscosity=31,000 mPa·s at 20° C.)
  hydroxyethyl cellulose (HEC)
    (MS=2.5, 2 wt % aqueous solution viscosity=31,000 mPa·s at 20° C.)
(2) Defoamer
  SN-Defoamer 14HP
    (oxyalkylene base defoamer by San Nopco Ltd.)
(3) Gum
  diutan gum (DG)
    KELCO-CRETE DG-F by CP Kelco
  welan gum (WG)
    CP Kelco K1A-96 by CP Kelco
    used as 1.0 wt % aqueous solution
  xanthan gum (XG)
    KELZAN by CP Kelco
    used as 1.0 wt % aqueous solution
  gellan gum (GG)
    KELCOGEL AFT by CP Kelco
    used as 1.0 wt % aqueous solution
(4) Water-reducing agent
  Chu-po-ru EX60T
    (polycarboxylic acid base water-reducing agent by Takemoto Oil&Fat Co., Ltd.)

Test

A graduated measuring cylinder with a stopcock was filled with 100 ml of the one-component water-reducing agent and allowed to stand in a chamber at 20° C. for 3 days, after which the volume of water-soluble cellulose ether sedimented was determined. The 3-day holding corresponds to the time passed from the charge of one-component water-reducing agent until the completion of hydraulic composition, as a simulation of an actual ready-mixed concrete plant where the water-reducing agent is statically held in a tank for a certain time and fed to a concrete mixer when necessary.

The evaluation of the sediment volume is as follows. A uniformly dispersed state without salting out is 100%. With the passage of time, a clear portion starts appearing at the top of the cylinder. A graduation mark corresponding to the boundary between the clear portion and the dispersed portion is read. For example, when the graduation mark on the cylinder corresponding to the boundary between the clear portion and the dispersed portion after 3 days is 90 ml, the sediment volume is 90%.

Table 1 tabulates the results of evaluation of the stability of the one-component water-reducing agent.

TABLE 1

|  | Amount of water-reducing agent added (g) | Water-soluble cellulose ether | | Amount of defoamer added (g) | Gum | | Sediment volume (%) |
|---|---|---|---|---|---|---|---|
|  |  | Type | Amount (g) |  | Type | Amount (g) |  |
| Example 1 | 200 | HPMC | 2.0 | 0.6 | DG | 0.40 | 96 |
| Example 2 | 200 | HPMC | 2.0 | 0.8 | DG | 0.40 | 98 |

TABLE 1-continued

| | Amount of water-reducing agent added (g) | Water-soluble cellulose ether Type | Amount (g) | Amount of defoamer added (g) | Gum Type | Amount (g) | Sediment volume (%) |
|---|---|---|---|---|---|---|---|
| Example 3 | 200 | HPMC | 2.0 | 1.0 | DG | 0.40 | 100 |
| Example 4 | 200 | HPMC | 2.0 | 1.4 | DG | 0.40 | 100 |
| Example 5 | 200 | HPMC | 2.0 | 1.4 | DG | 0.30 | 96 |
| Example 6 | 200 | HEMC | 2.0 | 1.4 | DG | 0.40 | 100 |
| Example 7 | 200 | HEC | 2.0 | 1.4 | DG | 0.60 | 100 |
| Example 8 | 200 | HPMC | 2.0 | 1.0 | WG | 30.0 | 100 |
| Example 9 | 200 | HPMC | 2.0 | 1.0 | XG | 30.0 | 100 |
| Example 10 | 200 | HPMC | 2.0 | 1.0 | GG | 40.0 | 85 |
| Comparative Example 1 | 200 | HPMC | 2.0 | 1.4 | — | — | 11 |

As seen from Table 1, one-component water-reducing agents consisting of cellulose ether, defoamer, gum, and water-reducing agent (Examples 1 to 10) undergo no or little sedimentation and exhibit satisfactory stability.

Examples 1 to 4 in which the amount of defoamer varies show that the one-component water-reducing agent becomes stabler as the amount of defoamer increases. Example 6 using hydroxyethyl methyl cellulose (HEMC) and Example 7 using hydroxyethyl cellulose (HEC) also offer stable one-component water-reducing agents which are unsusceptible to salting-out. Further, Examples 8, 9 and 10 using welan gum, xanthan gum and gellan gum instead of diutan gum are unsusceptible to salting-out and remain stable.

Comparative Example 1, one-component water-reducing agent having no gum added shows an extremely low sediment volume, indicating the lack of stability due to salting-out.

Hydraulic Composition

Examples 11 to 20 and Comparative Example 2

Hydraulic compositions were prepared by mixing the one-component water-reducing agents of Examples 1 to 10 with cement, fine aggregate, coarse aggregate, AE agent, and water in a proportion as shown in Table 2. These compositions were tested by the following methods, with the results shown in Table 3.

Ingredients
(1) Cement (C)
  normal Portland cement (Taiheiyo Cement Co., Ltd.)
  Density 3.16 g/cm$^3$
(2) Fine aggregate (S): sand with maximum particle size 5 mm, from Shimonigorigawa, Myokou City, Niigata, Japan
  Water absorption: 2.29%
  Saturated surface-dry density: 2.57 g/cm$^3$
  Fineness modulus: 2.81%
(3) Coarse aggregate (G): crushed stone with maximum particle size 20 mm, from Shimonigorigawa, Myokou City, Niigata, Japan
  Water absorption: 2.05%
  Saturated surface-dry density: 2.61 g/cm$^3$
  Fineness modulus: 6.62%
(4) AE agent: Micro-Air 303A (BASF Japan, anionic surfactant)
(5) Water (W): city water

TABLE 2

| Maximum size of coarse aggregate (Gmax), mm | Water/cement ratio* (W/C), % | Sand percentage** (s/a), % | Unit weight, kg/m$^3$ | | | |
|---|---|---|---|---|---|---|
| | | | Water (W) | Cement (C) | Fine aggregate (S) | Coarse aggregate (G) |
| 20 | 50.0 | 47.0 | 165 | 330 | 833 | 950 |

*Water/cement (%) = [(water)/(cement)] × 100% by weight
**Sand percentage (%) = [(fine aggregate)/(fine aggregate + coarse aggregate)] × 100% by volume Concrete Mixing A 100-L forced action biaxial mixer was charged with cement, fine aggregate, and coarse aggregate in accordance with the concrete formulation shown in Table 2, followed by 10 seconds of dry mixing. Then water, the one-component water-reducing agent, and AE agent were fed. The amount of the one-component water-reducing agent was 4.62 kg per m$^3$ of the hydraulic composition, which corresponded to 1.4 wt % based on the unit cement weight. The amount of the AE agent was 0.002 wt % in Examples 11 to 15 and 18 to 20, 0.003 wt % in Example 16, 0.004 wt % in Example 17, and 0.004 wt % in Comparative Example 2, all based on the unit cement weight. The ingredients were mixed for 90 seconds, obtaining a concrete composition as hydraulic composition. The volume of mixed concrete per batch was 50 L.

The one-component water-reducing agent was prepared by using the water-reducing agent, water-soluble cellulose ether, defoamer, and gum described above in one hundred times amount to the amount shown in Table 1, mixing them, and standing the obtained agent for 3 days.

Tests
1. Concrete temperature
  The temperature of ingredients was adjusted such that the concrete composition had a temperature of 20±3° C. at the end of mixing.
2. Air content
  tested according to JIS A 1128.
3. Slump test
  tested according to JIS A 1101.
  A reference concrete was obtained by mixing the ingredients in the same way as in Examples except that the water-soluble cellulose ether, defoamer and gum were omitted from the one-component water-reducing agent, that is, only the water-reducing agent was added. This reference concrete showed a slump value of 19.0 cm. The slum values of Examples and Comparative Example are compared with the slump value of the reference concrete.

4. Bleeding tested according to JIS A 1123. A low bleeding value indicates better segregation resistance.

The test results are shown in Table 3.

TABLE 3

| | One-component water-reducing agent | | Slump (cm) | Air content (%) | Temp. (° C.) | Bleeding (%) |
|---|---|---|---|---|---|---|
| | Type | Amount (kg/m³) | | | | |
| Example 11 | Example 1 | 4.62 | 18.0 | 5.3 | 20.8 | 1.8 |
| Example 12 | Example 2 | 4.62 | 18.5 | 5.5 | 21.0 | 1.7 |
| Example 13 | Example 3 | 4.62 | 18.5 | 5.2 | 20.5 | 1.7 |
| Example 14 | Example 4 | 4.62 | 18.0 | 4.9 | 20.5 | 1.6 |
| Example 15 | Example 5 | 4.62 | 18.5 | 5.0 | 21.5 | 1.8 |
| Example 16 | Example 6 | 4.62 | 19.0 | 5.0 | 21.3 | 2.0 |
| Example 17 | Example 7 | 4.62 | 18.0 | 5.3 | 20.5 | 2.5 |
| Example 18 | Example 8 | 4.62 | 18.0 | 5.5 | 21.0 | 2.1 |
| Example 19 | Example 9 | 4.62 | 18.5 | 5.0 | 20.5 | 1.9 |
| Example 20 | Example 10 | 4.62 | 17.5 | 4.5 | 18.5 | 1.9 |
| Comparative Example 2 | Comparative Example 1 | 4.62 | 20.0 | 5.1 | 21.0 | 4.5 |

As seen from Table 3, the concrete compositions comprising a one-component water-reducing agent having gum added thereto show stable flow as demonstrated by their slump values which have only a difference of no significance from the slump value (19.0 cm) of the reference concrete. The water-soluble cellulose ether added to concrete exerts a bleeding control effect. There are obtained uniform, self-consolidating concrete compositions free of segregation.

The concrete composition of Comparative Example 2 shows stable flow as demonstrated by its slump value which has a difference of no significance from the slump value (19.0 cm) of the reference concrete. Since no gum is added, the one-component water-reducing agent undergoes salting-out and the water-soluble cellulose ether sediments. When this one-component water-reducing agent is added to concrete, the desired amount of water-soluble cellulose ether is not added. The concrete composition exhibits substantial segregation and to high bleeding and is non-uniform.

Japanese Patent Application Nos. 2014-142198 and 2014-183182 are incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A one-component water-reducing agent comprising
   a thickener for hydraulic composition, said thickener comprising (A) a water-soluble cellulose ether selected from the group consisting of alkyl celluloses, hydroxyalkyl celluloses, and hydroxyalkyl alkyl celluloses, (B) a defoamer, and (C) a gum selected from the group consisting of diutan gum, welan gum, xanthan gum, and gellan gum; and
   a water-reducing agent, wherein said water-reducing agent is a polycarboxylic acid copolymer and/or a salt thereof.

2. A method for preparing a hydraulic composition, comprising the step of
   mixing the one-component water-reducing agent of claim 1 with a hydraulic substance, an aggregate and water.

* * * * *